US009922206B2

(12) United States Patent
Van Eerd et al.

(10) Patent No.: US 9,922,206 B2
(45) Date of Patent: Mar. 20, 2018

(54) PRIVATE DATA EXCHANGE

(71) Applicant: BlackBerry Limited, Waterloo (CA)

(72) Inventors: Peter Anthony Van Eerd, Guelph (CA); Richard Jeffrey Kehres, Waterloo (CA); James Walkoski, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 33 days.

(21) Appl. No.: 14/873,690

(22) Filed: Oct. 2, 2015

(65) Prior Publication Data
US 2017/0098097 A1   Apr. 6, 2017

(51) Int. Cl.
G06F 21/62     (2013.01)
G06F 21/60     (2013.01)
H04W 8/18      (2009.01)
H04W 12/02     (2009.01)

(52) U.S. Cl.
CPC ........ G06F 21/6245 (2013.01); G06F 21/602 (2013.01); G06F 21/6254 (2013.01); G06F 21/6281 (2013.01); H04W 8/183 (2013.01); H04W 12/02 (2013.01); H04L 2209/04 (2013.01); H04L 2209/043 (2013.01)

(58) Field of Classification Search
CPC .................................................. G06F 21/6281
See application file for complete search history.

(56) References Cited

U.S. PATENT DOCUMENTS

| 7,324,972 | B1 | 1/2008 | Oliver et al. |
| 7,496,751 | B2 | 2/2009 | de Jong et al. |
| 7,689,926 | B2* | 3/2010 | de Souza ............. G06F 3/0481 715/781 |
| 7,941,197 | B2 | 5/2011 | Jain et al. |
| 8,534,564 | B2 | 9/2013 | Hammad |
| 9,076,231 | B1 | 7/2015 | Hill et al. |
| 9,081,978 | B1 | 7/2015 | Connolly et al. |
| 2006/0074897 | A1* | 4/2006 | Fergusson ......... G06F 17/30699 |
| 2008/0163368 | A1 | 7/2008 | Harris et al. |

(Continued)

OTHER PUBLICATIONS

Dong et al.; Protecting Sensitive Web Content from Client-side Vulnerabilities with CRYPTONS; 2013; Retrieved from the Internet <URL: http://dl.acm.org/citation.cfm?id=2516743>; pp. 1-14, as printed.*

(Continued)

*Primary Examiner* — Saleh Najjar
*Assistant Examiner* — Michael Chao
(74) *Attorney, Agent, or Firm* — Jeffrey N. Giunta; Fleit Gibbons Gutman Bongini & Bianco P.L.

(57) ABSTRACT

A system and method to exchange data among applications are disclosed. A request for information that includes private information is received from a user application. A respective indicator for each private information field within the requested information is determined. A protected set of information is provided to the user application. The protected set of information comprises the requested information with the respective indicator replacing the private information in each private information field of the requested information. At least one indicator is received from the user application. The original data corresponding to the received at least one indicator is determined.

20 Claims, 7 Drawing Sheets

(56) References Cited

U.S. PATENT DOCUMENTS

| | | | |
|---|---|---|---|
| 2009/0025063 A1* | 1/2009 | Thomas | G06F 21/6218 726/4 |
| 2010/0205189 A1* | 8/2010 | Ebrahimi | G06F 21/6227 707/757 |
| 2011/0154219 A1* | 6/2011 | Khalatian | G06F 3/1462 715/751 |
| 2011/0162074 A1 | 6/2011 | Helfman et al. | |
| 2012/0240238 A1* | 9/2012 | Gates | H04N 21/41407 726/26 |
| 2012/0259877 A1* | 10/2012 | Raghunathan | G06F 21/6254 707/757 |
| 2014/0150114 A1* | 5/2014 | Sinha | H04W 12/00 726/28 |
| 2014/0217169 A1 | 8/2014 | Lewis et al. | |
| 2014/0351943 A1* | 11/2014 | Gianniotis | G06F 21/6254 726/26 |
| 2015/0106923 A1 | 4/2015 | Waterson | |
| 2015/0149208 A1 | 5/2015 | Lynch et al. | |
| 2015/0150025 A1 | 5/2015 | Yuen et al. | |
| 2015/0199405 A1 | 7/2015 | Redlich et al. | |
| 2015/0200967 A1 | 7/2015 | Redlich et al. | |
| 2015/0213288 A1* | 7/2015 | Bilodeau | G06F 21/6245 726/26 |

OTHER PUBLICATIONS

European Examination Report dated Feb. 2, 2017 for European Patent Application No. 16188856.5 dated Feb. 6, 2017.

\* cited by examiner

FIG. 3

| | CONTACT | | | |
|---|---|---|---|---|
| | FIELD ORIGINAL DATA | PRIVATE | CODE | EXPIRATION TIME |
| 310 → | FIRST NAME | ✓ | XYZ | 1 NOV |
| 312 → | LAST NAME | | | |
| 314 → | NICK NAME | | | |
| 316 → | STREET ADDRESS | ✓ | ABC | 1 NOV |
| 318 → | MESSAGING ADDRESS | ✓ | DEF | 1 NOV |
| 320 → | TELEPHONE NUMBER | ✓ | LKW | 1 NOV |

| | ACCOUNT | | |
|---|---|---|---|
| | FIELD ORIGINAL DATA | PRIVATE | CODE |
| 410 → | PAYMENT COMPANY NAME | | |
| 412 → | DESCRIPTION | | |
| 414 → | ACCOUNT TYPE | | |
| 416 → | ACCOUNT NUMBER | ✓ | ACD — 420 |

| | PHOTO | | |
|---|---|---|---|
| | FIELD ORIGINAL DATA | PRIVATE | CODE |
| 510 → | DESCRIPTION | | |
| 512 → | FILE NAME | | |
| 514 → | PHOTOGRAPHIC DATA | ✓ | BCD — 520 |
| 516 → | PHOTOGRAPHIC METADATA | ✓ | ALF — 521 |

500, 502, 504, 506

PRIVATE DATA EXCHANGE

FIELD OF THE DISCLOSURE

The present disclosure generally relates to exchanging data or information between application programs, and more particularly to allowing untrusted applications to receive and send private data or information from trusted applications.

BACKGROUND

Computing devices are able to store data and information that are exchanged with different applications operating on the computing device. For example, a computing device operating as part of or in conjunction with a telephone is able to maintain contact information for a number of people the user of the computing device calls. Information about payment accounts, photos, and other things are also able to be stored by computing devices. This information is able to be provided to various other applications that perform various functions.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates a contact set of information, according to an example;

FIG. 4 illustrates an account set of information, according to an example;

FIG. 5 illustrates a photo set of information, according to an example;

DETAILED DESCRIPTION

Figure 1:
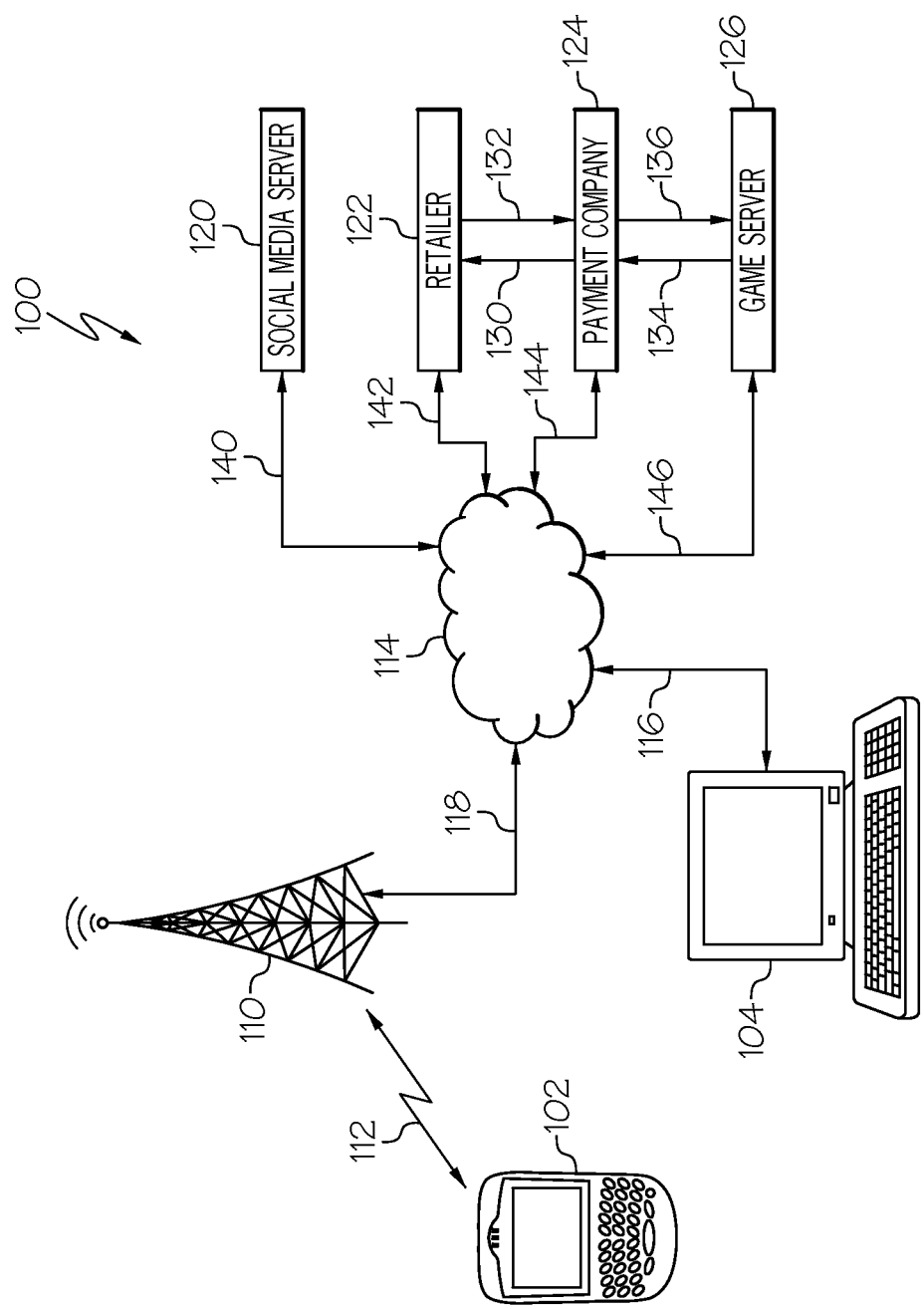
FIG. 1 illustrates a computing environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods support sharing information among applications while preventing some applications from obtaining certain parts of the information that can be more freely exchanged among other applications. In an example, some applications are identified as "base" applications that are able to receive and process all of the information stored on a device. These base applications in an example are trusted applications that are authenticated and provided by a trusted source. Other applications are referred to herein as "user" applications. In some examples, certain parts of the information maintained by and exchanged between and among base applications are identified as private information. Such private information is not made available to user applications. In some examples, user applications are able to request an information set from a base application, and the base application will provide the requested information set to the user application but the base application will replace the private information with an indicator that does not allow the user application to obtain or determine the private information itself. The user application is then able to later provide this indicator to the same base application, to different base applications, or to both, along with a request for processing to cause the base application to then obtain the actual private information and perform the requested processing.

In an example, a mobile telephone or other communications device is able to maintain contact information for a user of the device. This contact information can include a set of information for each person or other contact. In an example, a contact list entry for a person is able to include the person's first and last name, mailing address, telephone number(s), one or more e-mail addresses, other information, or combinations of these. A user is able to define certain information fields in each contact as "private" information that is not to be shared with user applications. In an example, a user may mark e-mail addresses in his or her contact information as private information. A user application is able to request a set of contact information from a base application, and the base application will create and send a protected set of information to the user application. In the protected set of information, the e-mail addresses, which in this example are marked as private information, are replaced by respective indicators. The user application is then able to provide one or more indicators to other base applications for further processing, such as sending an e-mail to the actual e-mail address.

Examples of base applications include one or more of e-mail functions, phone functions, display functions, and similar functions. In an example, base functions are provided by a trusted source, such as the manufacturer of the device executing the applications and functions. User applications are applications that may or may not have the same level of trust as base applications. Examples of user applications include applications added to a device by a user of the device, such as downloaded apps, functions performed by web browsers on the device, other similar applications, or combinations of these. Examples of a user application using an indicator corresponding to private information include a user application providing the indicator for an e-mail address to send an e-mail to the contact, providing the indicator of a phone number to a phone function to dial the number, providing the indicator of a last name to a display function to display the last name, other uses, or combinations of these. In some examples, display functions allow the display of private information in a manner that precludes a screen capture that includes the original private information.

The below described systems and methods enhance the security of using applications from unknown sources, that are of uncertain quality, or that are suspected of using information on the device for unnecessary or unwanted purposes. In an example, some downloaded "apps," which in one example are computer application programs that perform some type of specialized processing, may be suspected of leaking personal information from the device onto the internet or intentionally sending the information to malicious entities without the knowledge of the user of the device. In an example, an App might request access to the contacts list maintained on a device for purposes of facilitating a telephone call, but that App may not really need access to the actual phone number that is stored in the device's contacts list. For example, an App that may legitimately use a contact's telephone number to display the number, cause the phone function to dial the number, or both. The App in this example only passes the number along to respective internal device functions for display or dialing, and does not need access to the actual phone number. In this example, a contact manager, a display function, and a phone function are trusted, or "base" applications, and the App is a user application. The contact manager maintains the contact information including the telephone number, the display function displays the phone number, and the phone function dials the phone. The user App merely passes the phone number indicator along and does not require the actual phone number value for its purposes.

In a conventional approach of providing the App with the actual phone number, an App could also send the actual phone number of a contact to undesired destinations. Other examples of information stored on a device that could be directly provided to an App even though the App does not need the actual information for its own processing includes, but is not limited to, identification information, addressing information, payment account information, photos stored on the device, other types of media stored on the device, or combinations of these.

In an example, each individual field of information stored by a device is able to be marked as private information, and if so marked, the information is able to be encrypted or encoded. Examples of fields that are able to be marked or not marked as private information include, but are not limited to, fields such as a contact's name, telephone number, address, and the like.

In an example, contact information stored by the device has the telephone number marked as private information. A user application in this example is able to request contact information for a person, but does not receive the actual telephone number for the requested contact. The user application in this example receives an indicator in place of the original data of the private information. In an example, the user application receives the string "phone:qR67Cx4" in the "telephone number field, where "qR67Cx4" is an indicator for the original telephone number stored in the contact information. The user application in this example is able to cause the device to make a phone call by sending the string "phone:qR67Cx4" to the phone function, which is able to obtain or determine the original information, i.e., the actual phone number in this instance, to actually initiate the telephone call to that number.

In some example, only part of an information field is able to be marked or treated as private information. In an example, a contact name is able to be "John Smith." In an example, a contact manager is able to be configured to treat only a part of the name field for individuals in the contact information as private. For example, the contact manager is able to treat a particular word in a contact's name, such as the first word or last word, as non-private, and all other words in the contact as private. In an example of a contact with a name "John Quincy Smith," the contact manager is able to specify that the first word in a name, i.e., the contact's first name, is not private while all other parts of the contact's name are. In such an example, the user application is able to receive an indicator of the contact's name as "John string: qwhdw" where the "string:" term is recognized as an token introducing an indicator corresponding to a private information field. In such an example, the user application is able to use the word "John" to identify the contact, but the user application will not have access to the other parts of the contact's name. In some examples, specifying a particular word in a name field, such as the first word, last word, or any specific word, is able to accommodate naming conventions of various languages and cultures where the first word, last word, or other word is a less unique identifier of a person, such as a given name in a European culture.

In this example, the user application is also able to cause the actual telephone number to be displayed to the user even though the user application does not have the actual telephone number. In an example, a display function is able to operate as a separate process, such as in a secure sandbox or through another mechanism. The user application in this example is able to cause the device to display the actual phone number by sending "phone:qR67Cx4" to the display function, and the display function, being a trusted base application, is able to obtain or determine the original information, i.e., the actual phone number in this instance, to actually present the original phone number on the display to the user. In an example, the phone function controls or implements the taking of "screen shots" and therefore the display function is able to automatically "black-out" or re-encode a portion of a screen capture image that contains a display of any secure display fields when taking the screen shot. Thus, even if the user application tried to programmatically read the memory of the pixels on display, it would not be able to read original phone number that is being displayed to the user.

In some examples, a user application is also provided with a size of a field that would be used to display the original information along with the indicator of the information. Providing the size of the field used to display the original information allows the user application to create an appropriate screen layout that includes a presentation of the original information without having the original information itself. In an example, a user application is able to create a display that includes a phone number, which is private data, and to the right of the number the display is to show a "call now" button. The user application is able to properly format the display with the display field size information provided by the base application and thereby properly place the "call now" button next to the telephone number when the original telephone number is displayed by the base application. The display field size provided by the base application is able to represent any suitable value. For example, a height and width in pixels used to display the actual value of the original data is able to be provided. In further examples, a fixed size for the field, such as a fixed size to display all phone numbers, is able to be configured for the device or provided by the base application along with the indicator value.

In the above described examples, the user application is not provided with the actual phone number from the contact list maintained by the device. The actual phone number is never in the process memory space of the user application and the user application never has access to memory or other storage that has the original phone number. Similar protections are also provided for any information field that is marked as "private." Information that is not marked as private, such as a contact's first name, a nick name, other information, or combinations of these, are able to be provided directly to or read directly by the user application.

In some examples, portions of a document are also able to be identified as private information while other portions of the same document are not indicated as private information. In such examples, a document is able to have sections privatized or redacted using indicators for those values, as is described herein. In one example, user applications are able to provide commands to the display system, which is a trusted base application, to display the whole document. In another example, the trusted application is able to provide a user application with enough layout information describing the private information so that the user application is able to create a display with non-private portions of the document that leaves space for the private information, and the display system is able to insert the private information into the space left by the user application. Such division of documents into private and non-private portions is able to be used to divide both text portions and image portions of a document.

FIG. 1 illustrates a computing environment 100, according to an example. The computing environment 100 depicts two electronic devices, a portable electronic device 102 and a computer 104. In general, these electronic devices are used by individuals to perform various functions. These electronic devices are examples of devices that include data storage used to store applications, user data, system data, other data, or combinations of these. The illustrated electronic devices are only examples used to illustrate certain relevant aspects in this description and are not limiting. In general, a large variety of any type of suitable electronic device is able to incorporate data storage and one or more processors that use data stored in the data storage to perform restricted operations within the device. It is to be understood that the systems and methods described herein are applicable to any computing device that restricts some operations.

The depicted electronic devices are shown to be able to perform electronic communications with each other and with other devices (not shown) via a communications network 114. The portable electronic device 102 is in wireless communications with a wireless base station 110 via a wireless link 112. A wireless base station 110 is depicted for ease of understanding and description, but is understood represent one or more wireless communications systems. Examples of communications system using a wireless base station 110 include long range wireless communications such as cellular communications systems, wide area wireless network systems, any other long range wireless communications system, or combinations of these. The wireless base station 110 is also able to include one or more shorter range wireless communications systems such as WiFi®, Bluetooth®, Near Field Communications (NFC), any other short range system, or combinations of these.

The wireless base station 110 and the computer 104 are connected to a communications network 114. Examples of the communications network 114 include, but are not limited to, the Internet, data communications networks connecting selected locations, any accessible network, any data communications network, or combinations of these. The computer 104 in the illustrated example is connected to the communications network 114 by a first link 116. The wireless base station 110 in the illustrated example is connected to the communications network by a second link 118. The use of a simple link in this illustration is for ease of understanding and explanation, but it is understood that electronic devices and wireless nodes, such as the computer 104, wireless base station 110, other devices, or combinations of these, are able to be connected to the communications network 114 by any suitable technique. Particular connections to the communications network is able to be via, for example, sub-networks that include one or more of wired connections or wireless connections.

The computing environment 100 further depicts a number of servers or other providers that user devices are able to communicate with through the communications network 114. In the illustrated example, servers and service providers include a social media server 120, a retailer 122, a payment company 124 and a game server 126. In various examples, a user device, such as the portable electronic device 102 or computer 104, is able to communicate with one or more remote servers or service providers to utilize services available through those servers.

Figure 2:
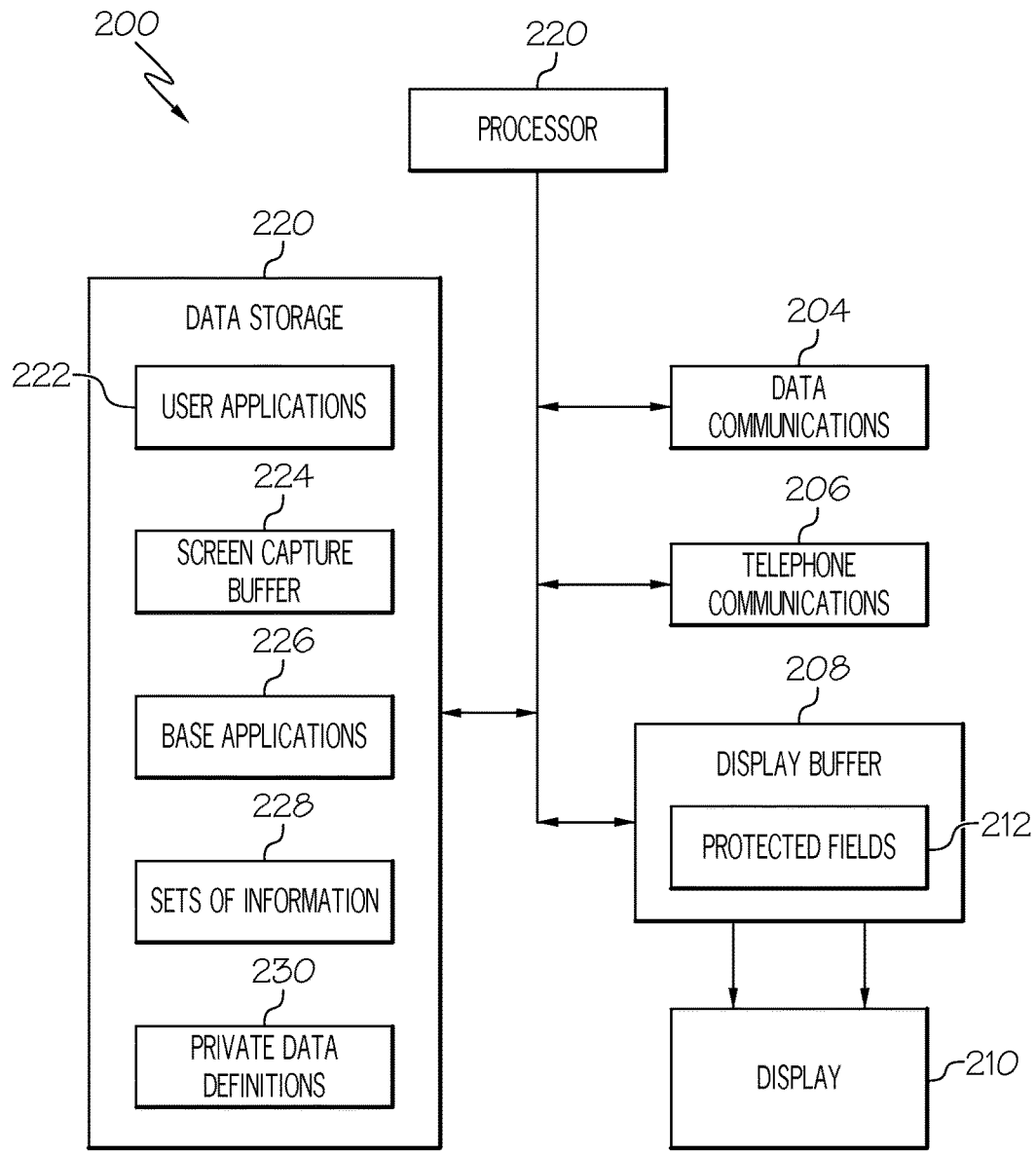
FIG. 2 illustrates an electronic device block diagram, according to an example.

FIG. 2 illustrates an electronic device block diagram 200, according to an example. The electronic device block diagram 200 depicts certain components of a communications device, such as examples of a portable electronic device 102 or computer 104 discussed above. The electronic device block diagram 200 includes systems to perform various types of communications. The depicted electronic device block diagram 200 includes a data communications system 204 that performs data communications with various other devices over various communications links, such as via the communications network 114 in conjunction with the wireless link 112 or the first link 116. With reference to the computing environment 100, the data communications system 204 is able to communicate with one or more of the social media server 120, the retailer 122, the payment company 124, the game server 126, or with any combination of these. The electronic device block diagram 200 also includes a telephone communications system 206 to perform, for example, voice communications with various other telephone devices.

The electronic device block diagram 200 includes a display 210 and a display buffer 208 that is used to support driving the display 210 to present information to a user. The processor 202 in one example interacts with the display buffer 208 to create data to be presented on the display 210. In some examples, the processor 202 is able to perform "screen captures" to capture the data in the display buffer 208 and thereby capture a representation of the image being presented on the display 210. In some examples, applications being executed by the processor 202 are able to receive the screen capture data and thereby determine what data is being presented to the user. In some examples, the processor 202 is able to configure one or more protected fields 212 within the display buffer 208. As is described in further detail below, a protected field 212 is an area of the display for which the processor 202 does not provide screen capture data to a user application, but rather provides other information, such as a blank spot or an indicator, so that the user application is not able to determine the actual data that is presented on the display 210.

The electronic device block diagram 200 further includes a data storage 220. The data storage 220 in an example is able to store application programs, operating system executable files, data used by the operating system, applications, or both, any other type of data, or combinations of these. The illustrated data storage 220 includes user applications 222, which is able to include applications that are either provided with a device or that the user of the device is able to download to the device and use. The data storage 220 further includes a screen capture buffer 224 that is used to store data captured from the display buffer 208 and that describes the image presented on the display 210.

The data storage 220 further includes base applications 226. In one example, base applications 226 include trusted applications, such as applications provided by the manufacturer of the device containing the elements depicted in the electronic device block diagram 200. The base applications 226 in an example are executed by a base application processor that executes on the processor 202.

The data storage 220 further includes sets of information 228. In an example, sets of information 228 include data maintained and used by the base applications 226. The data storage 220 on one example further includes private data definitions 230. As is described in further detail below, certain fields of data within the sets of information 228 are able to be marked as private data, while in general some fields of data are not marked as private. The indications of which fields are marked as private are stored in the private data definitions 230 in one example. As is described below, data within the sets of information 228 are able to be provided to user applications 222, but data fields that are marked as private are not directly provided to user applications 222. In some examples data provided to user applications are modified so that an indicator is provided to indicate the data within private fields. This indicator does not contain the private data so that the user applications are not able to determine the actual value of the data within those private fields.

FIGS. 3-5 illustrate portions of sets of information such as are depicted by the sets of information 228 described above with regards to the electronic device block diagram 200. In general, sets of information are able to include any type of data. The data stored in the sets of information 228 are typically divided into multiple data fields, such as is described below for the illustrated examples. In some examples, some of the data fields in the sets of information 228 contain information, such as a friend's e-mail address, that a user may not want to openly share or have sent to destinations that the user is not aware of. In some examples, other data fields are less sensitive, such as a contact's first name. In the below examples, each set of information includes data fields that are sensitive, and are thus marked as private data, and other fields are judged to be not as sensitive and thus are not marked as private.

FIG. 3 illustrates a contact set of information 300, according to an example. The contact set of information 300 depicts contact information for one individual that a device is able to store to facilitate sending communications to that individual. A device is able to store many sets of information for many contacts, with each set of information containing contact information for a corresponding individual. In general, the device stores sets of contact information 300 in the above described set of information 228. In an example, each data field in each set of contact information is able to be separately marked as private data. In some examples, particular data fields in the contact set of information 300 are marked as private, and each set of contact information 300, or subsets of all of the set of contact information 300, stored by the device have those particular data fields marked as private.

The illustrated set of contact information 300 includes a number of data fields, represented as separate rows in the set of contact information 300, that is each able to contain three types of information. Each data field in the set of contact information 300 includes field original data column 302, a private field indicator column 304, and a code column 306. The field original data column 302 includes the actual data for that data field as is described in further detail below. The private field indicator column 304 in an example includes an indicator that indicates whether that particular data field is to be treated as a private data field. The code column 306 in some examples stores a unique code that has a value that is different from other codes stored in the code column 306 of any other data field of any set of contact data. The data in the code field in some examples is provided to user applications as an indicator in place of the actual data in the field original data column 302. The user applications are then able to return that code value to other base application, which have access to the contact set of information 300, and those other base applications are able to determine the respective original data that corresponds to the respective indicator, such as this particular code value.

The illustrated contact set of information 300 includes a first name row 310, a last name row 312, a nick name row 314, a street address row 316, an e-mail address row 318, and a telephone number row 320. Each of these rows are able to specify not only the actual data for this particular contact, but also whether the data in that particular row is to be treated as "private" or not. If data is to be treated as private, a code is also able to be stored in this example to facilitate exchanging contact information without divulging the information in private information fields and readily determining the original information by authorized processing components.

The first name row 310 contains the contact's actual first name, such as "John" or "Jane," in the field original data column 302. The first name row 310 further contains a private indicator field in the private field indicator column 304. In this example, the first name row 310 is not marked as private. The decision to mark the first name row 310 as not private is able to be based on any criteria, such as a judgment that many people have the same first name and unexpected or unintended disclosure of a person's first name is not considered to be serious in this instance. The first name row 310 does not have an indicator in the indicator column 304, thereby marking this row as not private. In further examples, the first name row is able to be indicated a not private by any suitable technique.

The last name row 312 contains the contact's actual last name, such as "Smith," in the field original data column 302. The last name row 312 further contains a private indicator field in the private indicator column 304. In this example, the last name row 312 is marked as private. The decision to mark the last name row 312 as private is able to be based on any criteria, such as a judgment that last names are a more effective way to distinguish individuals. The last name row 312 does is shown to have an indicator in the indicator column 304, thereby marking this row as private. In further examples, the last name row 312 is able to be indicated a private by any suitable technique. The last name row 312 in this example includes data "XYZ" 330 in the code column 306. The data in the code column 306 is a unique data value that is provided to user applications in place of the actual data value as is stored in the field original data column 302. Base applications, which are authorized access to the contact set of information 300, are able to, for example, later receive that code value from a user application. Once the base application receives the code value, the data in the code column 306 in each stored set of contact information is searched to find the unique code value, and the actual data corresponding to that code value is determined by accessing the field original data column 302 in the row that has that code value. The code value stored in the code column 306 is able to be generated by any suitable technique, such as sequential or pseudorandom character generation process, a hash function of the data stored in the field original data column 302, any other suitable technique, or combinations of these.

The last name row 312 further contains an expiration time in an expiration time column 308. In some examples, the indicator, such as the above described code, that is provided to user applications is able to have a specified expiration time. In some examples, base applications will not process requests that are provided with an indicator that is past its expiration time. In the illustrated example, an expiration time of 1 Nov., or November, is specified. The present year is assumed in this example. In some examples, indicators, such as the code values described above, do not expire so no expiration time is used. Data that is not marked as private does not have an expiration time.

As is described above, some examples are able to use one data information field to store the name of the contact, and only part of the contact name is marked as private. In such some of these examples, the non-private part is provided to the user application and an indicator that corresponds to the private part of the name is provided to the user application. The marking of a portion of a field as private is able to be performed by any suitable technique, such as particular delimiting characters, tokens, any other technique, or combinations of these.

The nickname row 314 contains a nickname used for the contact in the field original data column 302. Nicknames are able to be any suitable identifier for the contact. In general, a user of a device may define nicknames for one contact, several contacts, or all contacts in the set of information 228 to more easily identify the contacts. In some examples, nicknames are able to be treated as non-private information, while in others nicknames are able to be marked as private. In this example, the nickname row 314 does not have an indicator in the indicator column 304, thereby marking this row as not private. The decision to mark the nickname row 314 as not private is able to be based on any criteria, such as a judgment that the user defined nickname is not able to identify the corresponding individual to others. The code column 306 also does not contain data because the data in this row is not private and the data in the field original data column 302 is directly provided to user applications.

The street address row 316 contains the contact's actual street address in the field original data column 302. In various examples, the street address row 316 is also able to include the complete mailing address for the contact and include items such as the contact's city, state, and ZIP or other mail zone indication code in the field original data column 302. The street address row 316 contains a private indicator field in the private indicator column 304 that indicates the data in the street address row 316 is private. The decision to mark the street address row 316 as private is able to be based on any criteria, such as a judgment that a person's street address should not be provided to others unless necessary. The street address row 316 includes data "ABC" 332 in the code column 306. As described above, the unique data value stored in the code column 306 is provided to user applications to allow base applications retrieve the original data value.

The messaging address row 318 contains the contact's actual messaging address in the field original data column 302. The messaging address row 318 is able to include any type of address that is used to send a message to the contact associated with the contact set of information 300. Examples of data stored in the messaging address row 318 include, but are not limited to, e-mail addresses, text messaging addresses, multi-media messaging addressing, any type of messaging address, or combinations of these. The illustrated contact set of information 300 depicts one messaging address row 318 in order to more concisely depict relevant aspects. In general, a contact set of information is able to include multiple messaging address rows that each contains a different messaging address to be used with various messaging communications channels. The illustrated messaging address row 318 further contains a private indicator field in the private indicator column 304. In this example, the messaging address row 318 is marked as private. The decision to mark the messaging address row 318 as private is able to be based on any criteria, such as a judgment that messaging addresses are private and not information that should be shared without need. The messaging address row 318 includes data "DEF" 334 in the code column 306, which is similar to the data in the code column 306 for the other rows as is described above.

The telephone number row 320 contains the contact's actual telephone number in the field original data column 302. Person's telephone numbers are often kept private for reasons similar to messaging address information. The telephone number row 320 also contains a private indicator in the private indicator column 304 and an associated code of "LKW" in the code column 306, which is similar to the private indicator in the private indicator column 304 and the data in the code column 306 for some of the other rows as are described above.

The street address row 316, messaging address row 318, and telephone number row 320 further include an expiration time of "1 Nov." which is similar to the expiration time discussed above with regards to the last name. In various examples, all private data items in a protected set of information are able to have the same expiration time, or separate expiration times are able to be specified for some of the private data times. The amount of time used to set expiration times is able to be any suitable value based on any consideration.

In some examples, one or more fields are able to have more than one indicator. In an example, separate indicators are able to be created for each user application. In such an example, each of the separate indicators for a particular field is able to be specific to one ore user applications. In such examples, further processing may determine whether an indicator provided to one user application is able to be used by a different user application. The use of different indicators for different user applications that indicate the same original private data allow further security rules to be defined and enforced. In an example, a photo application that was provided access to photographic data may be unable to access the same photo six months later because the indicator had expired and the photo won't be able to be accessed by the application via that indicator.

FIG. 4 illustrates an account set of information 400, according to an example. The account set of information stores data used by a device to allow a user of the device to access various account maintained by, for example, remote servers. Examples of such account and servers are discussed above with regards to the social media server 120, retailer 122, payment company 124, and game server 126. As is similar to the contact set of information 300 descried above, the depicted account set of information 400 includes data for one account. In general, a device is able to store one or more account sets of information in the sets of information 228, where each account set of information each stores data about a different account.

The account set of information 400 includes a field original data column 402, a private indicator column 404 and a code column 406. The account set of information 400 includes a payment company name row 410, a description row 412, an account type row 414, and an account number row 416. As is similar to the set of information described above with regards to the contact set of information 300, the data in each of these rows is able to include a private data indicator in the private data indicator column 404. The data contained in an account set of information is able to be provided to user applications but data in fields marked as private, such as with an indication in the private information column 404, is not directly provided to the user application. Rather, when a user application requests the data within an account set of information, original data in fields marked as private is replaced with a code value that is stored in the code column 406. User applications are then able to return that code value to the same or other base applications for use in processing with that private data.

FIG. 5 illustrates a photo set of information 500, according to an example. The photo set of information 500 includes information for a photo that is stored in the set of information 228. In various examples, a device is able to store photographs that user application are able to send to various destinations, such as to e-mail or other messaging addresses, to photo sharing web sites, to other destinations, or to combinations of these. In addition to forwarding photos to other destinations, some user applications are able to perform operations on the photographic image such as color filtering, providing special effects, other manipulations, or combinations of these. In addition to photographs, a similar set of information is able to store information regarding any type of media, such as videos, animations, other multimedia presentations, other types of media, or combinations of these.

The illustrated photo set of information 500 includes a description row 510, a file name row 512, a photographic data row 514, and a photographic metadata row 516. The original data column 502 stores the original data for the respective rows, which is able to be marked as private based on identifiers in the private indicator column 504. As is similar to the above discussed contact set of information 300 and account set of information 400, a data row marked as private with a private indicator in the private indicator column 504 also has a code value in the code column 506. The illustrated photo set of information 500 shows the photographic data row 514, which defines the actual pixels of a photograph, and the photographic metadata row 516, which stores information about the photograph and may include location information associated with the photograph, are marked private. The photographic data row 514 has a code "BCD" 520 and the photographic metadata row 516 has a code "ALF" 521. In some examples, a user application requesting photographic data will receive these two codes instead of the actual photographic data, and those codes are able to be provided to base applications that have access to the photo set of information 500, such as e-mail clients, other messaging applications, data communications application, other applications, or combinations of these. These base applications will retrieve the original photographic data in the field original data column 502 of the photographic data row 514, and possibly also the original photographic metadata based on its code, and send the original data to the intended destination. Additionally, the user application is able to provide the code "BCD" 520 to a display program within the base applications to cause the actual photographic data to be displayed to the user.

The data in the description row 510 and file name row 512 is not marked as private in this example. The description row 510 generally contains information to describe the photo. The description row 510 is able to contain data entered by a user, and also contain other information such as a time and date of the photograph. The file name row 512 generally contains identification of the file that stores the original photographic data. The information in these rows is able to be used by user applications to sort or otherwise prepare presentations of available photographs to the user. The information in the description row 510 and file name row 512 may be considered to be suitable for widely sharing because the information does not contain personal or other private data.

The example account set of information 400 and the photo set of information 500 described above do not have expiration times for the indicators of the private data in protected sets of information. Further examples are able to provide such expiration times, as are described above with regards to the contact set of information 300.

Figure 6:
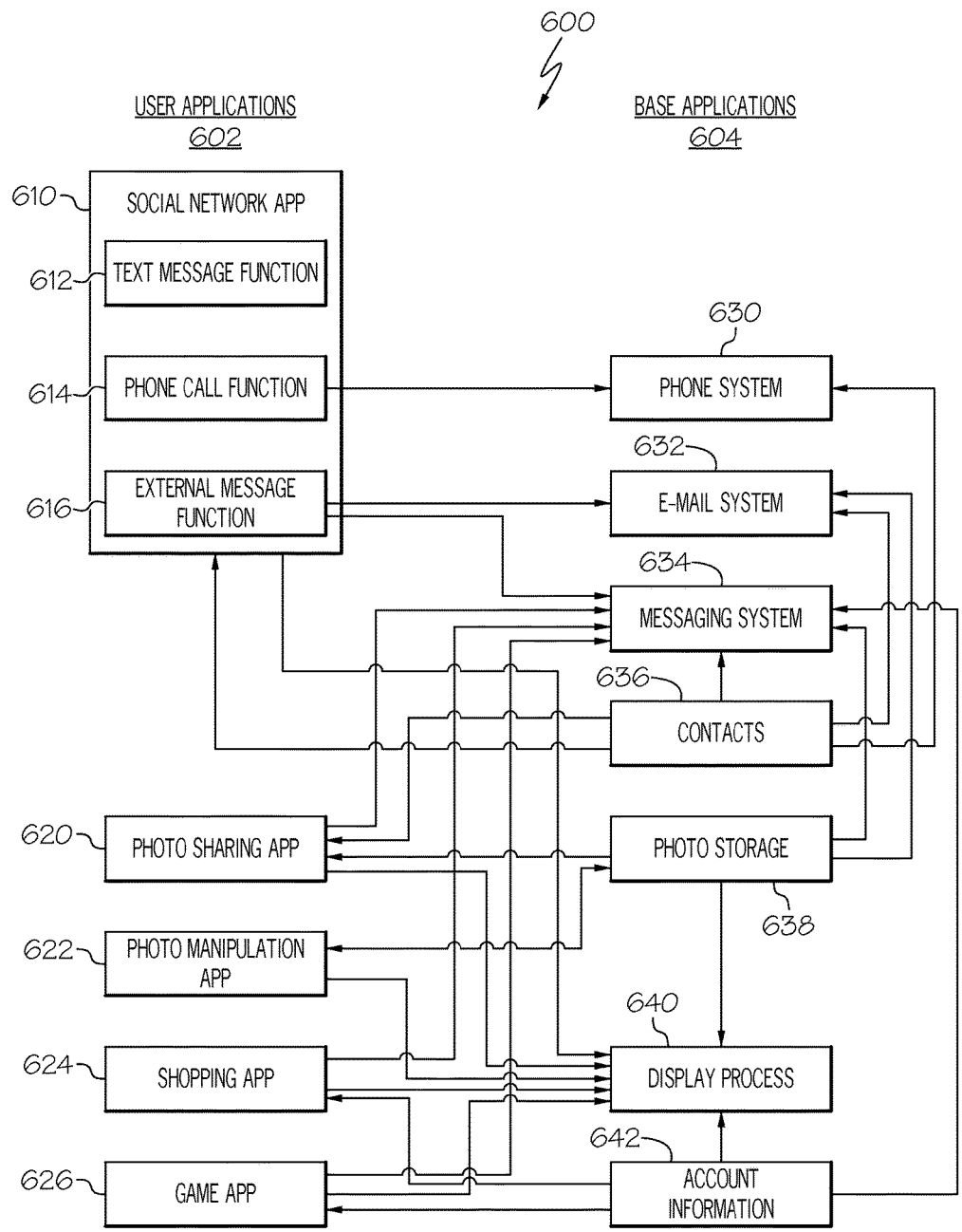
FIG. 6 illustrates an application interoperation diagram, according to an example.

FIG. 6 illustrates an application interoperation diagram 600, according to an example. The application interoperation diagram 600 depicts the organization and intercommunications between various applications and programs within a device, such the portable electronic device 102 or computer 104 discussed above with regards to FIG. 1 and which may have a configuration such as is shown in the device block diagram 200.

The application interoperation diagram 600 depicts two classes of application, user applications 602 and base applications 604. Base applications 604 are generally applications, programs, or the like, that are provided by the manufacturer of a device on which they are operating, or are applications, programs, or the like, that are trusted on one or more bases as suitable to have access to private information on the device. In an example, the base applications are executed by a base application processor that operates within the processor 202 discussed above.

The application interoperation diagram 600 depicts user application 602 such as a social network app 610, a photo sharing app 620, a photo manipulation app 622, a shopping app 624, and a gaming app 626. In general, the user applications 602 are applications that are not provided with private information, but that are provided with information that is not marked as private. The user applications 602 are able to request information from base applications 604. If the requested information includes private information, any information not marked as private is provided to the user application, and information marked as private is replaced with a code that indicates that private information and that code is provided to the user application in place of the private information. That code is able to be provided to any other base application to allow that base application to retrieve the original, private, information for use as required.

The application interoperation diagram 600 also depicts base applications 604 that include a phone system 630, an e-mail system 632, a messaging system 634, a contacts database 636, a photo storage 638, a display process 640, and an account information storage 642. In general, the base applications are applications that have been determined to be suitable to have access to private information. The base applications 604 in an example are able to communicate with other base application to retrieve original private information stored by the other base application.

The phone system 630 is a component of the device that allows a user to conduct a telephone call to another device. In general, the phone component is able to place, receive, or both place and receive a call that includes one or more of a voice call, a video call, any type of call, or combinations of these. The phone system 630 generally uses a telephone number or other destination specifier to place a call to a specified destination. In an example, a user app is able to send the phone system 630 a code that corresponds to a telephone number in the contacts storage 636. The phone system 630 is then able to access the contact entries within the contacts storage 636 and determine the original phone number associated with that code, and use that original phone number to place the call to the desired destination, all without the user application having access to the original phone number.

The e-mail system 632 is able to exchange e-mail messages with various destinations. The e-mail system is able to send e-mail messages to specified e-mail addresses. In an example, user applications 602 are able to provide a code that represents the original e-mail address of a desired recipient. The e-mail system is then able to access the contact information within the contacts storage 636 to retrieve the original e-mail address that corresponds to the received code, and send the e-mail to the specified recipient. In addition to receiving codes indicating e-mail recipients, the e-mail system 632 in some example is further able to receive a code indicating a photograph to be sent in an e-mail message, and the e-mail system 632 is able to access the photo storage 638 to retrieve the original photo information to include the original photo into the e-mail message to be sent.

The messaging system 634 operates similarly to the e-mail system 632 and allows a device to exchange messages in any format via various messaging protocols, service providers, other types of systems, or combinations of these. The messaging system 634 is able to receive codes representing destination addresses, photo information, other information, or combinations of these that are to be used to send a message with specified content to specified destinations. The messaging system 634 is able to access the other base applications 604 to retrieve the original information based on the code received from the user applications 602.

The contacts storage 636 stores contact information, such as is described above with regards to the contact set of information 300. The photo storage 638 stores photo information, such as is described above with regards to the photo set of information 500. The account information storage 642 stores account information, such as is described above with regards to the account set of information 400. The contacts storage 636, photo storage 638, and account information storage 642 are able to receive requests from user applications 602 for information stored by those components. In responding to those requests, any information marked as private is changed into a code that represents the original information, and the original private information itself is not provided to the user applications 602. The user applications 602 are then able to provide that code to other base applications 604, such as the phone system 630, e-mail system 632, messaging system 634, or secure messaging system 340. A base application receiving such a code is then able to access the other base application that maintains that data, such as the contacts storage 636, photo storage 638, or account information storage 642, to obtain the original information to support addressing communications, communicating requested information, displaying information, The display process 640 presents information to a user of a device, such as on a visual display device. As is discussed above, the display of some devices is able to use a display buffer, such as the above described display buffer 208, that includes protected fields 212. In some examples, user applications are able to present private data within protected fields 212 by providing the display process 640 a code representing the private information to the display process 640, and the display process 640 retrieves the original information from the base application that maintains that information.

The illustrated social network app 610 in one example is an app provided by a social network service provider that allows a user to exchange messages, data, photos, other media, other information, or combinations of these, with others who also have a corresponding social network app 610 on their device. The illustrated social network app 610 includes several functions. These functions are for illustration of some aspects of this example and are not intended to be limiting. The social network app 610 includes a text message function 612, a phone call function 614, and other messaging function 616. The text messaging function 612 in an example is a messaging function that allows a user of a device to send text messages entered by the user to others within the social network associated with the social network app 610. The text messaging function 612 in an example uses data, such as message addressing data, member contact information, other data, or combinations of these, that is maintained by the social network itself. As such, the text messaging function 612 is able to operate without access to data that originated from or that is stored by other components of the device.

The social network app 610 further includes a phone call function 614. The phone call function 614 allows a user to place a phone call to a contact whose information is stored in the contacts storage 636. In an example, the social network app 610 is able to request contact information from the contacts storage 636, but private information, such as the contacts' telephone number, is substituted with a code representing the original telephone number. In such an example, the phone call function 614 provides that code to the phone system 630 to place a call to the selected contact. The phone system 630 then retrieves the original phone number from the contacts storage 636 to place the call. In various examples, contact information provided to the social network app 610 has enough data that is not marked as private, such as a "nickname" 314, to allow the social network app 610 to identify the contact for selection by the user. In some examples, the contact information, including the codes that are substituted for private information, is provided to the display process 640 to be presented to the user and allow the user to select the desired contact to which a call is to be placed.

The social network app 610 includes an external message function 616. The external message function 616 in an example operates similarly to the phone call function to allow a user to send a message, such as an e-mail or other message, to a user via a messaging medium outside of messaging provided by the social network. For example, the external message function 616 is able to request contact information from the contacts storage 636. The received contact information will substitute codes for the private information such as e-mail address or messaging addresses. The external message function 616 provides those codes to the e-mail system 632 or messaging system 634 to send a message, and those systems obtain the original addressing information from the contacts storage 636 based on those codes.

The photo sharing app 620 allows a user of a device to share photos with other devices or with photo sharing services such as web sites or other sharing services. The photo sharing app 620 is able to request photo information from the photo storage 638, but if the photo information is marked as private, the photo sharing app 620 receives a code that was substituted for the photo information. The photo sharing app 620 is able to provide that code to the display process 640 to allow the photo itself to be presented to the user of the device, and the code is able to be provided to a messaging system to allow the original photo information to be included in a message that is sent to a specified destination.

A photo manipulation app 622 is an application that allows a user to edit or otherwise manipulate photo information. In an example where photo information is marked as private in the photo storage 638, the photo manipulation program is an example of a user application 602 that uses the actual private information. In such examples, techniques are able to be used to allow a user to authorize the photo manipulation app 622 to receive the original photograph information to allow the user to manipulate that information and then provide the manipulated photo data to the photo storage 638. In such an example, the photo manipulation app 622 is able to be granted access based on user authorization to individual photo information. Such a configuration would not allow the photo manipulation app 622 to access all private photographs, but only those that the user authorizes. In further examples, image manipulation or processing functions are able to be provided by a trusted base application. Such applications are able to, for example, manipulate pixels by, e.g., blurring, sharpening, desaturating, performing other manipulation functions, or combinations of these. In an example, base applications that perform manipulations are able to return a new encoding to representing the new pixels and may not modify the original pixels.

The shopping app 624 allows a user to shop on an on-line retailer, such as the retailer 122 discussed above. The shopping app 624 is able to request information from the account information storage 642 that includes payment information to be used to purchase items from the retailer. As described above with regards to the account set of information 400, the account number 416 is marked as private, so the shopping app 624 in this example does not receive the original account number, but rather a code indicating the account number. In an example, the code is provided to the messaging system 634. The messaging system 634 is then able to retrieve the original account number from the account information storage 642 and send that account number to the retailer. The shopping app 624 is also able to provide the code indicating the account number to the display process 640. The display process 640 is then able to retrieve the original account number from the account information storage 642 so that the user is provided with a presentation of an order from the retailer that includes the original account number.

In some examples, the messaging system 634 presents on a display to a user of the device each message that is being sent by a user application 602 before such messages are sent. Such examples are also able to ask for a confirmation from the user to send the message. These examples preclude a user application 602 from sending a message without the user of the device knowing about the message, and may have the user explicitly confirm sending of each message originating with a user application 602. In some examples, a log file is able to be maintained by the base applications 604 to store a history of sent messages that originated from user applications to allow later auditing of message sending.

The game app 626 allows a user to play a game on the device. In some examples, the user is able to make purchases in the game. As is discussed above with regards to the shopping app 624, the game app 626 is able to request payment account information from the account information storage 642 and receive a code representing the account number. That code is able to be provided to the display process 640 to allow a presentation of an order in the game that includes the original payment account number. The game app 626 is also able to provide the code to the messaging system 634 so that the payment account number is able to be sent in a message to the seller.

Figure 7:
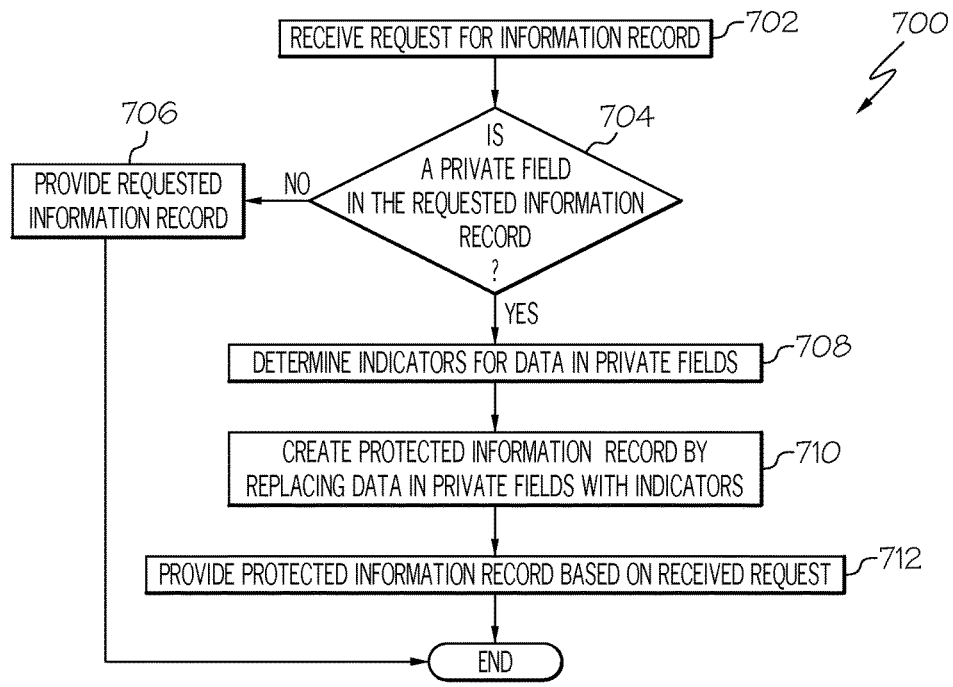
FIG. 7 illustrates a base application information request process, according to an example.

FIG. 7 illustrates a base application information request process 700, according to an example, The base application information request process 700 is an example of a process performed by a base application 604 when a user application 602 request information.

The base application information request process 700 begins by receiving at 702, a request or an information record. A determination is made, at 704, as to whether the requested information record includes a private field. If the information record does not include a field marked as private, the requested information record is provided, at 706, and the base application information request process 700 ends.

If it is determined that the requested information record does contain private information fields, the base application information request process 700 determines, at 708, at least one respective indicator for the data in the private fields. In an example, the at least one respective indicator is able to be codes that are generated independently of the actual value of the private data. Randomly generated codes, codes that are sequentially created, other similar codes, or combinations of these, are examples of codes that are generated independently of the value of the private data. In further examples, an indicator is able to be a hash value or other type of code that is generated based on the actual value of the private data. In these examples, the indicator is able to be stored in association with the original private data, and retrieval of the private data based on the indicator includes searching for the stored indicator and determining the private data that is associated with that indicator. In a further example, the indicator is able to be an encrypted data item that is created by encrypting the original value of the private information. In the case of an encrypted data set, the indicator is able to be decrypted to obtain the original private data set without again accessing the data storage containing the private information.

As discussed above, indicators are able to have associated expiration times. In some examples, two types of expiration time are able to be used in association with an indicator for private data. One type of expiration time is a user-defined expiration time for the particular indicator. With user-defined expiration times, no user application is able to access the data after the expiration time. Another type of expiration time is an expiration time for the indicator itself. In an example of an indicator that is based on encryption of the private data, the indicator may never expire because the data is in the indicator. In an example of an indicator that is based on a sequential or hash value, a request from a user application with an indicator older than a specified amount is able to be refused. In one example, indicators that are older than a specified time may be removed from tables storing those indicators, such as the contact set of information 300 described above. In some examples, once the indicators that are older than the specified time are removed, data requests containing those old indicators, which were removed, are refused and the requests are not processed. As is also discussed above, a particular field of private data could have more than one indicator, such as an example where each user application is given a separate indicator for the same private data. In such examples, determination, such as by generation, of indicators, refusal of data requests, and/or removal of indicators can be based on the user application from which the request was received.

After determining the at least one respective indicator, at 708, a protected information record is created, at 710, by replacing data in the private fields with the respective indicator for each private field. In various examples, the provided information record is able to represent the indicator by any suitable technique. In an example based on the example contact set of information 300, a request for a telephone number causes a protected set of information to be created that has the telephone number replaced with an indicator that is specified as "LKW" 336. In an example, the telephone data in the response would include a label to indicate that the data is an indicator that indicates a telephone number. Using the example of an indicator value of "LKW," the response would include a telephone data field specifying "phone:LKW."

In some examples, the user applications are provided with a specification of the size that would be used to display the private information in addition to the indicator for that information. As is discussed above, this size information allows a user application to properly format a presentation that includes the private information without having access to the original private information.

The protected information record is then provided, at 712, based on the received request. The base application information request process 700 then ends.

Figure 8:
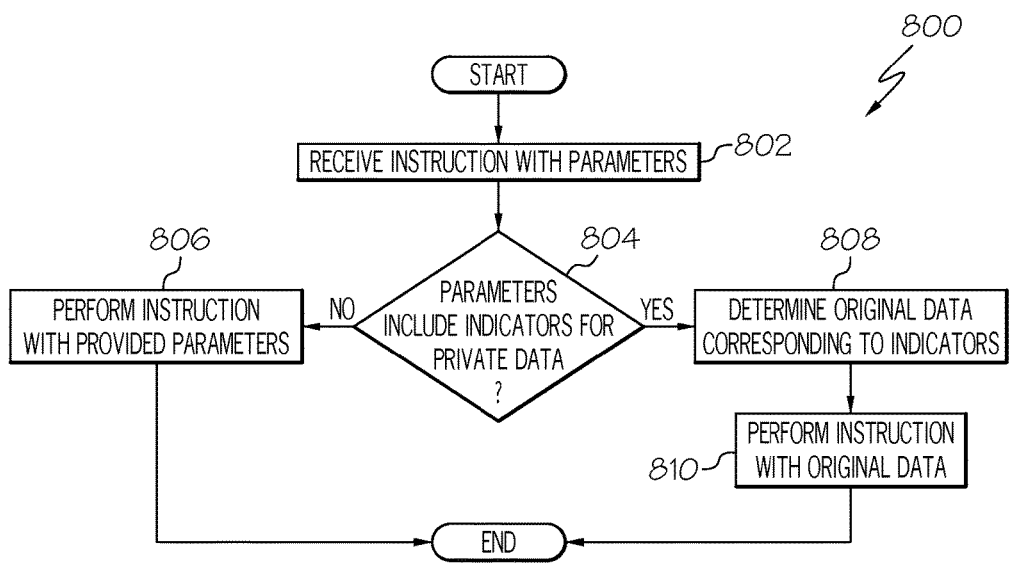
FIG. 8 illustrates an indicator usage process, according to an example.

FIG. 8 illustrates an indicator usage process 800, according to an example. The indicator usage process 800 is an example of a process used by a base application 604 to use a code, or other indicator value, that is provided by a user application 602. As is described above, the code, or other indicator value, was provided by a base application in response to a request for information that included private data.

The indicator usage process 800 begins by receiving, at 802, instructions with parameters. A determination is made, at 804, if the parameters include an indicator. This determination is able to be made based on, for example, configurations of a device that specifies certain types of data, such as e-mail addresses, that are marked as private data so that any e-mail address received from a user application 602 is assumed to be an indicator. If it is determined, at 804, that the parameters do not include indicators, the instruction is performed, at 806, with the provided parameters. If it is determined, at 804, that the parameters do include indicators, the original data corresponding to the indicators is determined, at 808. The instruction is then performed, at 810, with the original data that was determined based on the indicators. The indicator usage process 800 then ends.

Figure 9:
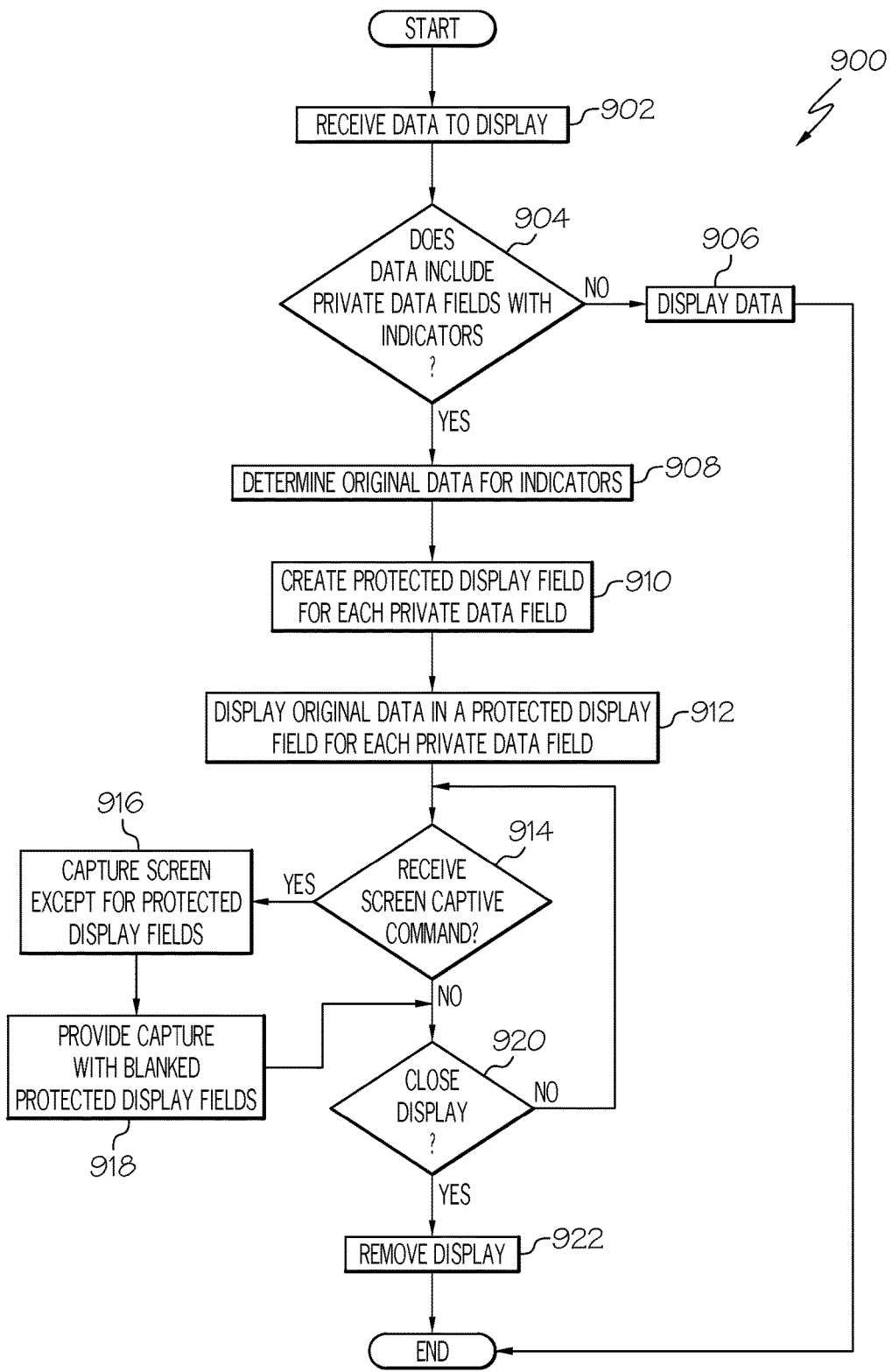
FIG. 9 illustrates a private data display process, according to an example.

FIG. 9 illustrates a private data display process 900, according to an example. The private data display process 900 is an example of a process to present information on a display of a device, where that information includes private information that is not provided to user applications. As is discussed above, the presentation of such information is able to be performed by providing a code to the display process 640, and the original private data is presented in a protected field 212 in a display buffer 208 so as to preclude a screen capture from obtaining an image of the displayed private data.

The private data display process 900 beings by receiving, at 902, data to display. A determination is made, at 904, if the data includes private data fields that are specified as indicators. If this determination is false, the private data display process 900 displays the data, at 906.

If it is determined, at 904, that the data to display includes private data that is specified as indicators, the private data display process 900 determines, at 908, the original data for the indicators. Determining the original data is able to be performed by any suitable technique. In an example of indicators comprising codes that are not based on the actual value of the private data, the codes that had been provided by base applications to user applications 602 are able to be searched to find the indicator and determine the original data to which they correspond. In an example that uses indicators comprising encrypted values of the private data, determining the original data is able to include decrypting the indicator.

A protected display field is created for each private data field, at 910. An example of protected display fields are described above with regards to the protected fields 212 in the display buffer 208 in the device block diagram 200. As is described below, protected data fields are able to be protected from a screen capture operation. The original data is then displayed, at 912, in a protected display field for each private data field.

A determination is made, at 914, if a command is received to capture the screen. If a command to capture the screen is received, the private data display process 900 captures the screen, at 916, except for the protected data fields. The captured screen image data is then modified to blank, at 918, the protected data fields to preclude the private data from being provided in the capture data.

After determining, at 914, that a screen capture command was not received, or after modifying the captured screen image, the private data display process 900 determines if the display is closed, at 920. If the display is not closed, the private data display process 900 returns to determining, at 914, if a screen capture command was received. If the display is determined to be closed, at 920, the display is removed, at 922, and the private data display process 900 ends.

Figure 10:
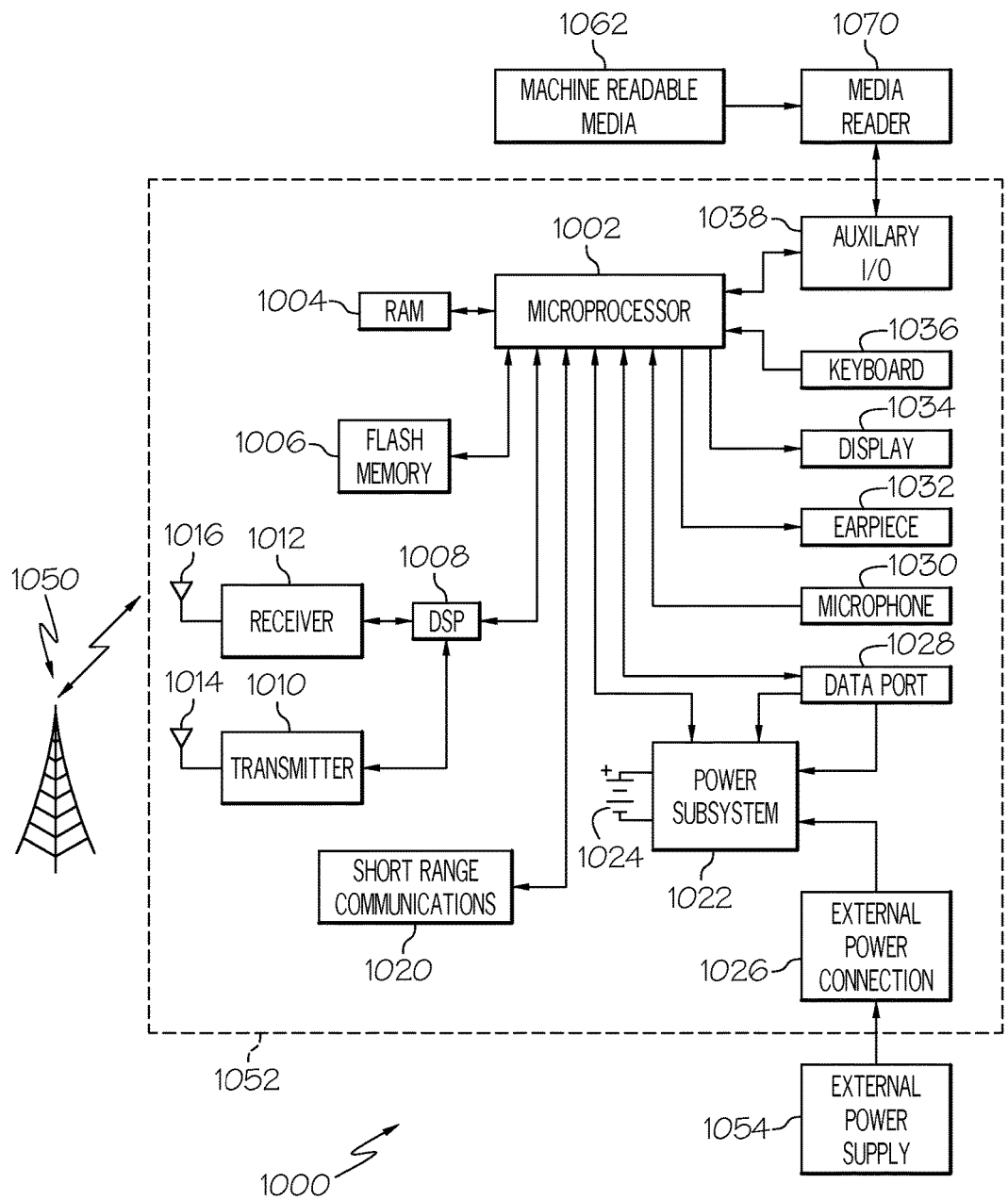
FIG. 10 is a block diagram of an electronic device and associated components in which the systems and methods disclosed herein may be implemented.

FIG. 10 is a block diagram of an electronic device and associated components 1000 in which the systems and methods disclosed herein may be implemented. In various examples, the electronic device 1052 is able to be an example of the above described portable electronic device 102, which is an example of a wireless two-way communication device with voice, text chat, and data communication capabilities. Such electronic devices communicate with a wireless voice, text chat, or data network 1050 using a suitable wireless communications protocol. Wireless voice communications are performed using either an analog or digital wireless communication channel. Data communications allow the electronic device 1052 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 1052 is an example electronic device that includes two-way wireless communications functions. Such electronic devices incorporate communication system elements such as a wireless transmitter 1010, a wireless receiver 1012, and associated components such as one or more antenna elements 1014 and 1016. A digital signal processor (DSP) 1008 performs processing to extract data from received wireless signals and to generate signals to be transmitted. The particular design of the communication system is dependent upon the communication network and associated wireless communications protocols with which the device is intended to operate.

The electronic device 1052 includes a microprocessor 1002 that controls the overall operation of the electronic device 1052. The microprocessor 1002 interacts with the above described communications system elements and also interacts with other device systems. In various examples, the electronic device 1052 is able to include one or more of various components such as a data storage 1006, random access memory (RAM) 1004, auxiliary input/output (I/O) device 1038, data port 1028, display 1034, keyboard 1036, earpiece 1032, audio sound reproduction system 1070, microphone 1030, a short-range communications system 1020, a power system 1022, other systems, or combinations of these.

One or more power storage or supply elements, such as a battery 1024, are connected to a power system 1022 to provide power to the circuits of the electronic device 1052. The power system 1022 includes power distribution circuitry for providing power to the electronic device 1052 and also contains battery charging circuitry to manage recharging the battery 1024 (or circuitry to replenish power to another power storage element). The power system 1022 receives electrical power from external power supply 1054. The power system 1022 is able to be connected to the external power supply 1054 through a dedicated external power connector (not shown) or through power connections within the data port 1028. The power system 1022 includes a battery monitoring circuit that is operable to provide a status of one or more battery status indicators, such as remaining capacity, temperature, voltage, electrical current consumption, and the like, to various components of the electronic device 1052.

The data port 1028 is able to support data communications between the electronic device 1052 and other devices through various modes of data communications, such as high speed data transfers over an optical communications circuits. Data port 1028 is able to support communications with, for example, an external computer or other device. In some examples, the data port 1028 is able to include electrical power connections to provide externally provided electrical power to the electronic device 1052, deliver electrical power from the electronic device 1052 to other externally connected devices, or both. Data port 1028 of, for example, an electronic accessory is able to provide power to an electronic circuit, such as microprocessor 1002, and support exchanging data between the microprocessor 1002 and a remote electronic device that is connected through the data port 1028.

Data communication through data port 1028 enables a user to set preferences through the external device or through a software application and extends the capabilities of the device by enabling information or software exchange through direct connections between the electronic device 1052 and external data sources rather than via a wireless data communication network. In addition to data communication, the data port 1028 provides power to the power system 1022 to charge the battery 1024 or to supply power to the electronic circuits, such as microprocessor 1002, of the electronic device 1052.

Operating system software used by the microprocessor 1002 is stored in data storage 1006. Examples of data storage 1006 are able to include, for example, flash memory, magnetic based storage devices, other volatile or non-volatile data store elements, or the like. The data storage 1006 is an example is able to include the above described data storage 220. Some examples are able to use data storage 1006 that includes a battery backed-up RAM or other non-volatile storage data elements to store operating systems, other executable programs, or both. The operating system software, device application software, or parts thereof, are able to be temporarily loaded into volatile data storage such as RAM 1004. Data received via wireless communication signals or through wired communications are also able to be stored to RAM 1004. The microprocessor 1002 in some examples includes a component, such as is able to be defined in data storage 1006 in one example, that include the processes described above that are stored in the program memory 220.

The microprocessor 1002, in addition to its operating system functions, is able to execute software applications on the electronic device 1052. A set of applications that control basic device operations, including at least data and voice communication applications, is able to be installed on the electronic device 1052 during manufacture. In an example, programs and other data used to support the processes described above are able to be installed in the memory of the electronic device 1052. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 1052 through, for example, the wireless network 1050, an auxiliary I/O device 1038, Data port 1028, short-range communications system 1020, or any combination of these interfaces. Such applications are then able to be installed by a user in the RAM 1004 or a non-volatile store for execution by the microprocessor 1002.

In a data communication mode, a received signal such as a text message or web page download is processed by the communication system, including wireless receiver 1012 and wireless transmitter 1010, and communicated data is provided the microprocessor 1002, which is able to further process the received data. In some examples, the electronic device 1052 includes a display, output ports, or combinations of these. In such examples, the received data is able to be processed for output to the display 1034, or alternatively, to an auxiliary I/O device 1038 or the Data port 1028. In examples of the electronic device 1052 that include a keyboard 1036 or other similar input facilities, a user of the electronic device 1052 may also compose data items, such as e-mail messages, using the keyboard 1036, which is able to include a complete alphanumeric keyboard or a telephone-type keypad, in conjunction with the display 1034 and possibly an auxiliary I/O device 1038. Such composed items are then able to be transmitted over a communication network through the communication system.

For voice communications, overall operation of the electronic device 1052 is substantially similar, except that received signals are generally provided to an earpiece 1032 and signals for transmission are generally produced by a microphone 1030. Alternative voice or audio I/O systems, such as a voice message recording system, may also be implemented on the electronic device 1052. Although voice or audio signal output is generally accomplished primarily through the earpiece 1032, in examples of electronic devices 1052 that include a display 1034, the display 1034 may also be used to provide an indication of the identity of a calling party, the duration of a voice call, or other voice call related information, for example.

Depending on conditions or statuses of the electronic device 1052, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 1020 provides for data communication between the electronic device 1052 and different systems or devices, which need not necessarily be similar devices. For example, the short-range communications system 1020 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 1060 is able to be connected to an auxiliary I/O device 1038 to allow, for example, loading computer readable program code of a computer program product into the electronic device 1052 for storage into flash memory 1006. One example of a media reader 1060 is an optical drive such as a CD/DVD drive, which may be used to store data to and read data from a computer readable medium or storage product such as computer readable storage media 1062. Examples of suitable computer readable storage media include optical storage media such as a CD or DVD, magnetic media, or any other suitable data storage device. Media reader 1060 is alternatively able to be connected to the electronic device through the Data port 1028 or computer readable program code is alternatively able to be provided to the electronic device 1052 through the wireless network 1050.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
   receiving at a processor from a user application, by a first base application in a set of base applications, a request for a requested information record within a set of information, information records within the set of information comprising at least one respective private information field, the set of base applications having access to the set of information, the user application not having access to a storage storing the set of information, the user application being separate from the set of base applications;
   determining, based on the request, a respective indicator for each respective original data item within each respective private information field within the requested information record;
   providing to the user application, based on receiving the request, a protected set of information and a specification of a display size for the protected set of information,
   the protected set of information comprising a subset of information within the requested information record, the subset of information excluding the respective original data item, the protected set of information further comprising the respective indicator replacing the each respective original data item within the at least one respective private information field of the requested information record;

receiving from the user application, by a second base application in the set of base applications where the second base application is separate from the first base application and comprises a display process, an instruction to present the respective original data item on a display of information, the instruction comprising at least one respective indicator;

creating, based on receiving the instruction to present the respective original data item on the display of information and based on the display size, a protected display area within a display, the protected display area having the display size and being protected from screen capture processing;

determining, based on the at least one respective indicator received from the user application, the respective original data item corresponding to the respective indicator; and presenting within the protected display area, based on receiving the instruction to present the respective original data item on the display of information and based on the respective indicator, the respective original data item corresponding to the respective indicator.

2. The method of claim 1, wherein the requested information record comprises contact information,
wherein the at least one respective private information field comprises at least one of a telephone number, a messaging address, or an e-mail address,
wherein the second base application further comprises a communications function, and
wherein the instruction comprises an instruction for conducting communications based upon the at least one of the telephone number, the messaging address, or the e-mail address.

3. The method of claim 1, wherein determining the respective indicator comprises determining a respective hash value of each respective original data item,
wherein the respective indicator is based on the respective hash value, and
wherein determining the respective original data item comprises matching the respective hash value to a hash value of respective original data item within the set of information.

4. The method of claim 1, wherein the respective indicator comprises an expiration time,
wherein the method further comprises determining that the receiving the at least one respective indicator occurs before the expiration time, and
wherein determining the respective original data item and presenting the respective original data item is based on determining that the receiving the at least one respective indicator occurs before the expiration time.

5. The method of claim 1,
the method further comprising:
receiving, subsequent to the presenting, a request to capture a representation of an image of the display; and
modifying, based on the request to capture, areas of the representation of the image that correspond to the protected display area to obscure presentation of the respective original data item.

6. The method of claim 1, further comprising:
storing, by the first base application, a plurality of information records comprising the requested information record, each information record in the plurality of information records comprising a set of information fields; and
storing a respective private information indication for at least one respective associated information field within the set of information fields, the respective private information indication indicating its respective associated information field is a private information field, and
wherein determining the respective indicator is determined for each respective associated information field having a respective private information indication.

7. The method of claim 1, wherein the instruction comprises an instruction to send the respective original data item to a server, and
wherein the method further comprises sending the respective original data item from the processor to the server.

8. The method of claim 1, wherein the providing to the user application a protected set of information comprises further providing a token associated with the protected set of information, the token indicating the protected set of information differs from the respective original data item.

9. The method of claim 1,
wherein the user application presents user application data on the display based on the specification of the display size for the protected set of information,
wherein the instruction comprises a specification of a location to present the protected display area within the display, and
wherein the creating the protected display area comprises creating a protected display area at the location and having the display size.

10. A device, comprising:
a processor;
a memory coupled to the processor;
a data storage, coupled to the processor; and
a base application processor that when operating:
receives, from a user application operating separately from the base application processor, a request for a requested information record within a set of information, information records within the set of information comprising at least one respective private information field, the base application processor having access to the set of information, the user application not having access to a storage storing the set of information;
determines, based on the request, a respective indicator for each respective original data item within each respective private information field within the requested information record;
provides to the user application, based on receiving the request, a protected set of information and a specification of a display size for the protected set of information,
the protected set of information comprising a subset of information within the requested information record, the subset of information excluding the respective original data item, the protected set of information further comprising the respective indicator replacing the each respective original data item within the at least one respective private information field of the requested information record;
receives from the user application, an instruction to present the respective original data item on a display of information, the instruction comprising at least one respective indicator
creates, based on receipt of the instruction to present the respective original data item on the display of information and based on the display size, a protected display area within a display, the protected display area having the display size and being protected from screen capture processing;

determines, based on the at least one respective indicator received from the user application, the respective original data item corresponding to the respective indicator; and presents within the protected display area, based on receipt of the instruction to present the respective original data item on the display of information and based on the respective indicator, the respective original data item corresponding to the respective indicator.

11. The device of claim 10, wherein the requested information record comprises contact information,
wherein the at least one respective private information field comprises at least one of a telephone number, a messaging address, or an e-mail address,
wherein the base application processor further comprises a communications function, and
wherein the instruction comprises an instruction for conducting communications based upon the at least one of the telephone number, the messaging address, or the e-mail address.

12. The device of claim 10, wherein the base application processor determines the respective indicator by at least encrypting the respective original data item corresponding to the respective indicator into an encrypted data item,
wherein the respective indicator comprises the respective encrypted data item, and
wherein determining the respective original data item comprises decrypting the encrypted data item.

13. The device of claim 10, wherein the respective indicator comprises an expiration time,
wherein the base application processor, when operating further determines that the at least one respective indicator is received before the expiration time, and
determines the respective original data item and presents the respective original data item based on a determination that the at least one respective indicator is received before the expiration time.

14. The device of claim 10,
the base application processor, when operating, further:
receives, subsequent to a presentation of the respective original data item, a request to capture a representation of an image of the display; and
modifies, based on the request to capture, areas of the representation of the image that correspond to the protected display area to obscure presentation of the respective original data item.

15. The device of claim 10, wherein the base application processor, when operating, further:
stores a plurality of information records comprising the requested information record, each information record in the plurality of information records comprising a set of information fields; and
stores a respective private information indication for at least one respective associated information field within the set of information fields, the respective private information indication indicating its respective associated information field is a private information field, and
wherein the base application processor determines the respective indicator for each respective associated information field having a respective private information indication.

16. A non-transitory computer readable storage medium having computer readable program code embodied therewith, the computer readable program code comprising instructions executable by a processor to:
receive from a user application, by a first base application in a set of base applications, a request for a requested information record within a set of information, information records within the set of information comprising at least one respective private information field, the set of base applications having access to the set of information, the user application not having access to a storage storing the set of information, the user application being separate from the set of base applications;
determine, based on the request, a respective indicator for each respective original data item within each respective private information field within the requested information record;
provide to the user application, based on receiving the request, a protected set of information and a specification of a display size for the protected set of information,
the protected set of information comprising a subset of information within the requested information record, the subset of information excluding the respective original data item, the protected set of information further comprising the respective indicator replacing the each respective indicator replacing respective original data item within the at least one respective private information field of the requested information record;
receive from the user application, by a second base application in the set of base applications where the second base application is separate from the first base application and comprises a display process, an instruction to present the respective original data item on a display of information, the instruction comprising at least one respective indicator
create, based on receipt of the instruction to present the respective original data item on the display of information and based on the display size, a protected display area within a display, the protected display area having the display size and being protected from screen capture processing;
determine, based on the at least one respective indicator received from the user application, the respective original data item corresponding to the respective indicator; and
present within the protected display area, based on receipt of the instruction to present the respective original data item on the display of information and based on the respective indicator, the respective original data item corresponding to the respective indicator.

17. The non-transitory computer readable storage medium of claim 16, wherein the requested information record comprises contact information,
wherein the at least one respective private information field comprises at least one of a telephone number, a messaging address, or an e-mail address,
wherein the second base application further comprises a communications function, and
wherein the instruction comprises an instruction for conducting communications based upon the at least one of the telephone number, the messaging address, or the e-mail address.

18. The non-transitory computer readable storage medium of claim 16, wherein instructions to determine the respective indicator comprise instructions to determine a respective hash value of the each respective original data item, wherein the respective indicator is based on the respective hash value, and wherein the instructions to determine the respective original data item comprise instructions to match the respective hash value to a hash value of respective original data item within the set of information.

19. The non-transitory computer readable storage medium of claim 16, wherein the respective indicator comprises an expiration time, wherein the instructions further comprise instructions to determine that the at least one respective indicator is received before the expiration time, and wherein both the instructions to determine the respective original data item determine the respective original data item and the instructions to present the respective original data item presents the respective original data item based on determining that the at least one respective indicator is received before the expiration time.

20. The non-transitory computer readable storage medium of claim 16, wherein the instructions further comprise instructions to:

receive, subsequent to presenting the respective original data item, a request to capture a representation of an image of the display; and modify, based on the request to capture, areas of the representation of the image that correspond to the protected display area to obscure presentation of the respective original data item.

* * * * *